US007014667B2

(12) United States Patent
Krull et al.

(10) Patent No.: US 7,014,667 B2
(45) Date of Patent: Mar. 21, 2006

(54) PREPARATION OF ADDITIVE MIXTURES FOR MINERAL OILS AND MINERAL OIL DISTILLATES

(75) Inventors: Matthias Krull, Harxheim (DE); Gerhard Bettermann, Voerde (DE); Curd-Werner Adams, Oberhausen (DE); Werner Reimann, Frankfurt am Main (DE)

(73) Assignee: Clariant GmbH, Frankfurt (DE)

( * ) Notice: Subject to any disclaimer, the term of this patent is extended or adjusted under 35 U.S.C. 154(b) by 315 days.

(21) Appl. No.: 10/676,962

(22) Filed: Oct. 1, 2003

(65) Prior Publication Data

US 2004/0065004 A1   Apr. 8, 2004

(30) Foreign Application Priority Data

Oct. 1, 2002 (DE) .............................. 102 45 737

(51) Int. Cl.
*C10L 1/14* (2006.01)
*B01F 15/00* (2006.01)
*B01F 17/00* (2006.01)
*C08K 3/00* (2006.01)
*C08F 210/02* (2006.01)

(52) U.S. Cl. ........................... 44/300; 44/385; 44/386; 44/412; 44/459; 524/81; 524/563; 524/570

(58) Field of Classification Search ............... 44/385, 44/412, 386, 300, 459; 524/81, 563, 570
See application file for complete search history.

(56) References Cited

U.S. PATENT DOCUMENTS

| 4,211,534 A | * | 7/1980 | Feldman ..................... 44/394 |
| 4,670,516 A | | 6/1987 | Sackmann et al. ........ 525/327.6 |
| 4,985,048 A | | 1/1991 | Wirtz et al. ................... 44/394 |
| 5,165,440 A | * | 11/1992 | Johnston ...................... 137/13 |
| 5,186,720 A | | 2/1993 | Feustel et al. ................ 44/351 |
| 5,391,632 A | * | 2/1995 | Krull et al. .............. 525/327.6 |
| 5,767,190 A | | 6/1998 | Krull et al. .................. 524/563 |
| 5,998,530 A | | 12/1999 | Krull et al. .................. 524/474 |
| 6,010,989 A | | 1/2000 | Krull et al. .................. 508/475 |
| 6,090,169 A | | 7/2000 | Krull et al. .................. 44/395 |
| 6,110,238 A | | 8/2000 | Krull et al. .................. 44/393 |
| 6,179,458 B1 | * | 1/2001 | Albers et al. ............... 366/76.1 |
| 6,391,071 B1 | | 5/2002 | Krull |
| 6,458,174 B1 | | 10/2002 | Krull et al. .................. 44/393 |
| 6,565,616 B1 | | 5/2003 | Krull et al. .................. 44/329 |
| 6,593,426 B1 | | 7/2003 | Krull et al. .................. 525/191 |

FOREIGN PATENT DOCUMENTS

| EP | 0 153 176 | 8/1985 |
| EP | 0 154 177 | 9/1985 |
| EP | 0 320 766 | 6/1989 |
| EP | 0 413 279 | 2/1991 |
| EP | 0 606 055 | 7/1994 |
| GB | 1455663 | 11/1976 |

OTHER PUBLICATIONS

"Einsatz und Ausegung statischer Mischer", Pahl, M.H. and E Muschelknautz, Chem. Ing. Tech., vol. 51, No. 5, (1979), pp. 347-363.

Römpp Chemie Lexikon, 9. Auflage, Thieme Verlag, 1988-1992, vol. 4, p. 3351ff.

"Comb-like Polymers-Structure and Properties", N.A. Platé and V.P. Shibaev, J. Poly. Sci. Macromoleculars Revs. 1974, 8, p. 117ff.

* cited by examiner

*Primary Examiner*—Kelechi C. Egwim
(74) *Attorney, Agent, or Firm*—Richard P. Silverman

(57) ABSTRACT

The present invention provides a continuous process for preparing additive mixtures for mineral oils and mineral oil distillates, comprising
A) a cold flow improver for middle distillates, and at least one further component selected from B) and C):
B) a further cold flow improver,
C) an organic solvent,
which comprises mixing cold flow improver and optionally solvent by means of a static mixer, the temperature of the additive mixture at the outlet of the static mixer being from 0° C. to 100° C.

22 Claims, No Drawings

PREPARATION OF ADDITIVE MIXTURES FOR MINERAL OILS AND MINERAL OIL DISTILLATES

The present invention relates to a continuous process for preparing sedimentation-stable additive mixtures for mineral oils and mineral oil distillates using a static mixer.

Depending on the origin of the crude oils, crude oils and middle distillates, such as gas oil, diesel oil and heating oil, obtained from crude oils contain different amounts of n-paraffins which, on reduction of the temperature, crystallize out as platelet-shaped crystals and sometimes agglomerate with the inclusion of oil. This agglomeration causes a deterioration in the flow properties of the oils or distillates, which can result in problems in the course of recovery, transport, storage and/or use of the mineral oils and mineral oil distillates. When transporting mineral oils through pipelines, the crystallization phenomenon, especially in winter, can lead to deposits on the tube walls and in a few cases, for example shutdown of a pipeline, even to their complete blockage. When storing and further processing the mineral oils, it may also be necessary in winter to store the mineral oils in heated tanks. In the case of mineral oil distillates, possible consequences of the crystallization include blockages of the filter in diesel engines and firing plants, which prevents reliable metering of the fuels and, under some circumstances, result in a complete interruption of the fuel or heating medium feed. Alongside the classical methods of eliminating the crystallized paraffins (thermally, mechanically or using solvents) which are based solely on the removal of the already formed precipitates, chemical additives (known as flow improvers) have been developed in the last few years. By physically interacting with the precipitated paraffin crystals, these modify their shape, size and adhesion properties. The additives function as additional crystal seeds and some of them crystallize out with the paraffins, which results in a larger number of smaller paraffin crystals having a changed crystal shape. The modified paraffin crystals have a lower tendency to agglomeration, so that the oils admixed with these additives can still be pumped or processed at temperatures which are often more than 20° C. lower than in the case of nonadditized oils.

Examples of flow improvers of this type are copolymers of ethylene and vinyl esters, acrylic esters or further olefinically unsaturated compounds. Examples of other components used for this purpose include paraffin dispersants, comb polymers, alkylphenol resins, olefin copolymers and fatty alkyl esters of polyols.

A multiplicity of different crude oils is used for the production of middle distillates. At the present time, the processing in the individual refineries is effected in more or less individual plant configurations. In addition, each refinery produces distillate qualities of different specifications, for example heating oil, summer diesel and winter diesel. For the adjustment of the cold properties of these different oils, additives optimized to the response behavior of the individual oils have been developed in the last few years, in order to ensure very low dosages and therefore reduced costs of on-spec configurations. In addition, the processing means of the refinery with regard to viscosity and pumpability of the additives have to be taken into account by suitable choice of the active ingredient concentration.

These special additives are frequently mixtures of different active ingredients which are specially adapted to the oil to be treated starting from a few basic active ingredients. Therefore, current additives generally include more than just one component. These mixtures can comprise different active ingredients of one class or different groups.

Additives based on ethylene copolymers in particular are semicrystalline polymers which are solid or highly viscous at room temperature. Before processing to give additive formulations or metering into middle distillates, they consequently have to be heated and/or diluted to reduce the viscosity, in order to be pumpable. This requires either constant warm storage or an appropriate delay time for heating. In the latter case, rapid heating in particular poses the risk of overheating in the region of the heating elements in the storage tank.

According to the prior art, additive mixtures are prepared batchwise, i.e. one or more active ingredient components and the solvent are metered in succession into a vessel and then mixed by stirring or circulation by pumping. This process is disadvantageous, since charging, heating and mixing take a long time. Especially in the case of mixing of active ingredients and solvent of different viscosity, the achievement of a sufficient homogeneity requires a relatively long period of stirring or circulation over several hours to days. The desired or required mixing temperature is generally attained only slowly depending on the amounts of the components to be mixed and their temperatures and also the heating output installed. However, it deviates distinctly from the mean value at the metering point of the components and also at the heating elements, for example. The temperature profile during the mixing procedure can therefore only be reproduced with difficulty. For a short-notice dispatch, a large number of vessels of ready-formulated additive mixtures additionally has to be maintained in the heated state in case required.

A problem in the batchwise preparation of such formulations if the fact that rapid heating in particular can result in significant overheating at the heating elements, for example the vessel jacket, which can lead on subsequent storage of the additives prepared in this way to sedimentation of the suspended active ingredients, especially the ethylene copolymers.

In addition, the flowability or pumpability of dispersions of these semicrystalline polymers is in many cases dependent on the mixing conditions. For instance, partially or incompletely molten formulations of semicrystalline polymers with solvents and optionally further active ingredients lead to dispersions having high pour points, whereas completely molten polymers give dispersions having distinctly lower pour points. The precise setting of a constant pour point of the formulation prepared, which is important for the product handling, is therefore possible in the case of batchwise mixing only with additional high technical and/or time demands, for example by heating or cooling the finished mixture.

The object on which the present invention is based is therefore to find a mixing process which avoids the disadvantages mentioned. Firstly, the homogeneity and the sedimentation stability of these mixtures should be improved. Secondly, it should enable additive mixtures having different compositions to be prepared from a few components at low cost and inconvenience and in a short time. At the same time, the pour point of the mixture should be controllable by the precise and rapid adjustment of the mixing temperature.

It has been found that, surprisingly, the required properties can be realized by a continuous mixing process which works at a defined and constant temperature using a static mixer.

The present invention provides a continuous process for preparing additive mixtures for mineral oils and mineral oil distillates, comprising A) a cold flow improver for middle distillates, and at least one further component selected from B) and C):
B) a further cold flow improver,
C) an organic solvent, which comprises mixing cold flow improver and optionally solvent by means of a static mixer, the temperature of the additive mixture at the outlet of the static mixer being from 0° C. to 100° C.

For the purposes of the invention, cold flow improvers are those materials which, in minor amounts of, for example, from 10 to 10 000 ppm, improve one or more cold flow properties of animal, vegetable or mineral oils, for example cloud point, cold filter plugging point, pour point and/or paraffin dispersancy. Such cold flow improvers are, for example and not exclusively, copolymers of ethylene and unsaturated esters, ethers and/or olefins,
polar nitrogen compounds,
alkylphenol-aldehyde resins,
comb polymers,
olefin copolymers and
polyoxyalkylene derivatives.

The temperature of the mixture at the end of the static mixer is preferably from 30 to 90° C., in particular from 50 to 85° C. The process according to the invention in principle does not require constant temperature. Preference is given to keeping the temperature constant at the outlet of the static mixer during the mixing within ±10° C., in particular within ±5° C.

The temperature of the cold flow improvers to be used is preferably adjusted in such a way that their viscosity is below 5000 mPas, preferably between 1 and 1000 mPas and more preferably between 10 and 500 mPas. Depending on the cold flow improver, these are up to 150° C., generally from 20 to 120° C. The solvent can have a higher or lower temperature. It is preferably selected in such a way that the resulting mixing temperature corresponds to the target temperature of the mixture. Semicrystalline cold flow improvers can be used above or below their cloud point. To set a low pour point, they are preferably used above the cloud point. For instance, ethylene copolymers in particular are preferably used at temperatures of from 20 to 120° C., more preferably between 60 and 100° C.

Static mixers are devices having stationary internals which effect mixing of fluid product streams using flow energy. By intensifying the turbulences in the tube through which flow occurs, they reduce the zone required for attaining a sufficient standard of mixing. In preferred embodiments, they consist of the same type of mixing elements which are installed in succession in a channel through which the product stream flows, individually or combined into groups, and offset by 90° relative to each other. The mixing elements should be configured in such a way that they spatially deflect and shear the product streams.

The choice of the suitable mixer depends not least on the flow in the conveying tube: for instance, a laminar flow requires more intensive separation, rearrangements and backmixing of the stream than turbulent flow. The prior art includes a multiplicity of designs of static mixers which are suitable for the process according to the invention. With regard to the very different designs of static mixers, reference is made to the review in M. H. Pahl and E. Muschelknautz, Chem.-Ing.-Tech., volume 51 (1979), pages 347 to 364, and this disclosure is incorporated in the present application by way of reference.

Useful static mixers have proven to be, for example, Multiflux, Sulzer, PMR, McHugh, Komax and Honeycomb, X, Ross-ISG and helical mixers. Particular preference is given to helical mixers having helical element groups of from 2 to 200, preferably from 5 to 100 and especially from 10 to 50, mixing elements which effect complete radial mixing, for example Kenics mixer.

Preference is given to using the static mixer in a pipeline used for conveying the combined additive components between the storage vessels of the flow improvers/solvent and the dispatch vessel. Additive components which are added to the formulation in minor proportions, for example up to 10% by volume, preferably up to 5% by volume, can also be added directly to the static mixer via an injection point. To attain a sufficient standard of mixing, preference is given to a relative mixer length L/D of from 2 to 50, in particular from 3 to 10, especially from 5 to 10, where L is the length and D is the diameter of the mixing zone.

Preference is given to the static mixer being dimensioned in such a way that the pressure drop over the mixing zone is less than 10 bar, in particular from 0.001 to 5 bar and especially from 0.05 to 1 bar.

In the simplest case, the pressure used to convey the components is utilized for mixing. However, in the case of more highly viscous formulations, it is also possible to use pressure-increasing pumps.

The mixing temperature can be attained either before or during the mixing procedure. Preference is given to metering the active ingredient or ingredients and solvent or solvents preheated into the mixing zone in such a way that the resulting mixture has the desired temperature. In a preferred embodiment, the temperature is adjusted in the mixing zone, for example, by means of a jacket or of a tube bundle, which leads to particularly gentle temperature adjusted.

To obtain a homogeneous mixture, the time required in the process according to the invention is less than 60 seconds, preferably less than 30 seconds, in particular less than 15 seconds and especially less than 5 seconds. This corresponds substantially to the time which the components require to flow through the static mixer and is faster by a factor of from 100 to 10 000 than in the case of batchwise mixing.

In a preferred embodiment, the cold flow improvers for middle distillates comprise one or more copolymers of ethylene and olefinically unsaturated compounds. Suitable ethylene copolymers are in particular those which, apart from ethylene, contain from 6 to 21 mol %, in particular from 10 to 18 mol %, of comonomers. These copolymers preferably have melt viscosities at 140° C. of from 20 to 10 000 mPas, in particular from 30 to 5000 mPas, especially from 50 to 2000 mPas.

The olefinically unsaturated compounds are preferably vinyl esters, acrylic esters, methacrylic esters, alkyl vinyl ethers and/or alkenes, and the compounds mentioned may be substituted by hydroxyl groups. One or more comonomers may be present in the polymer.

The vinyl esters are preferably those of the formula 1

$$CH_2=CH-OCOR^1 \qquad (1)$$

where $R^1$ is $C_1$ to $C_{30}$-alkyl, preferably $C_4$ to $C_{16}$-alkyl, especially $C_6$- to $C_{12}$-alkyl. In a further embodiment, the alkyl groups mentioned may be substituted by one or more hydroxyl groups.

In a further preferred embodiment, $R^1$ is a branched alkyl radical or a neoalkyl radical having from 7 to 11 carbon atoms, in particular having 8, 9 or 10 carbon atoms. Suitable vinyl esters include vinyl acetate, vinyl propionate, vinyl butyrate, vinyl hexanoate, vinyl heptanoate, vinyl octanoate, vinyl pivalate, vinyl 2-ethylhexanoate, and also vinyl neononanoate, vinyl neodecanoate, vinyl neoundecanoate, vinyl laurate and vinyl stearate.

The acrylic esters are preferably those of the formula 2

$$CH_2=CR^2-COOR^3 \qquad (2)$$

where $R^2$ is hydrogen or methyl and $R^3$ is $C_1$–$C_{30}$-alkyl, preferably $C_4$–$C_{16}$-alkyl, especially $C_6$–$C_{12}$-alkyl. Suitable acrylic esters include, for example, methyl (meth)acrylate, ethyl (meth)acrylate, propyl (meth)acrylate, n- and isobutyl (meth)acrylate, hexyl, octyl, 2-ethylhexyl, decyl, dodecyl, tetradecyl, hexadecyl and octadecyl (meth)acrylate and also the mixtures of these comonomers. In a further embodiment, the alkyl groups mentioned may be substituted by one or more hydroxyl groups. One example of such an acrylic ester is hydroxyethyl methacrylate.

The alkyl vinyl ethers are preferably compounds of the formula 3

$$CH_2=CH-OR^4 \qquad (3)$$

where $R^4$ is $C_1$–$C_{30}$-alkyl, preferably $C_4$–$C_{16}$-alkyl, especially $C_6$–$C_{12}$-alkyl. Examples include methyl vinyl ether, ethyl vinyl ether, isobutyl vinyl ether. In a further embodiment, the alkyl groups mentioned may be substituted by one or more hydroxyl groups.

The alkenes are preferably monounsaturated hydrocarbons having from 3 to 30 carbon atoms, in particular from 4 to 16 carbon atoms and especially from 5 to 12 carbon atoms. Suitable alkenes include propene, butene, isobutylene, pentene, hexene, 4-methylpentene, octene, diisobutylene and also norbornene and its derivatives such as methylnorbornene and vinylnorbornene. In a further embodiment, the alkyl groups mentioned may be substituted by one or more hydroxyl groups.

Apart from ethylene, particularly preferred terpolymers contain from 0.1 to 12 mol %, in particular from 0.2 to 5 mol %, of vinyl neononanoate or vinyl neodecanoate, and from 3.5 to 20 mol %, in particular from 8 to 15 mol %, of vinyl acetate, and the total comonomer content is between 8 and 21 mol %, preferably between 12 and 18 mol %. Apart from ethylene and from 8 to 18 mol % of vinyl esters, further particularly preferred copolymers also contain from 0.5 to 10 mol % of olefins such as propene, butene, isobutylene, hexene, 4-methylpentene, octene, diisobutylene and/or norbornene.

The process according to the invention can also be used to prepare additive mixtures which comprise further constituents used as cold flow improvers and/or mineral oil additives, for instance paraffin dispersants, alkylphenol resins, comb polymers and polyol esters.

Paraffin dispersants reduce the size of the paraffin crystals and have the effect that the paraffin crystals do not separate, but instead remain colloidally dispersed with a distinctly reduced tendency to sediment. Useful paraffin dispersants have proven to be oil-soluble polar compounds, preferably nitrogen compounds, having ionic or polar groups, for example amine salts and/or amides, which are obtained by reaction of aliphatic or aromatic amines, preferably long-chain aliphatic amines, with aliphatic or aromatic mono-, di-, tri- or tetracarboxylic acids or their anhydrides (U.S. Pat. No. 4,211,534). Equally suitable paraffin dispersants are amides and ammonium salts of aminoalkylene polycarboxylic acids such as nitrilotriacetic acid or ethylenediaminetetraacetic acid with secondary amines. Other paraffin dispersants are copolymers of maleic anhydrides and $\alpha,\beta$-unsaturated compounds which can optionally be reacted with primary monoalkylamines and/or aliphatic alcohols (EP-A-0 154 177), the reaction products of alkenyl-spirobislactones with amines (EP-A-0 413 279) and, according to EP-A-0 606 055, reaction products of terpolymers based on $\alpha,\beta$-unsaturated dicarboxylic anhydrides, $\alpha,\beta$-unsaturated compounds and polyoxyalkenyl ethers of lower unsaturated alcohols. Particularly preferred paraffin dispersants contain reaction products of secondary fatty amines having from 8 to 36 carbon atoms, in particular dicoconut fatty amine, ditallow fatty amine and distearylamine with carboxylic acids or their anhydrides.

Suitable paraffin dispersants also include alkylphenol-formaldehyde resins. Alkylphenol-aldehyde resins are described, for example, in Römpp Chemie Lexikon, 9th edition, Thieme Verlag 1988–92, volume 4, p. 3351ff. The alkyl radicals of the o- or p-alkylphenol in the alkylphenol-aldehyde resins which can be used in the process according to the invention may be the same or different and have 1–50, preferably 1–20, in particular 4–12, carbon atoms; they are preferably n-, iso- and tert-butyl, n- and isopentyl, n- and isohexyl, n- and isooctyl, n- and isononyl, n- and isodecyl, n- and isododecyl and octadecyl. The aliphatic aldehyde in the alkylphenol-aldehyde resin preferably has 1–4 carbon atoms. Particularly preferred aldehydes are formaldehyde, acetaldehyde and butyraldehyde, in particular formaldehyde. The molecular weight of the alkylphenol-aldehyde resins is 400–10 000, preferably 400–5000 g/mol. A prerequisite is that the resins are oil-soluble.

In a preferred embodiment of the invention, these alkylphenol-formaldehyde resins are those which contain oligo- or polymers having a repeating structural unit of the formula

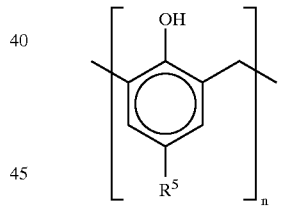

where $R^5$ is $C_1$–$C_{50}$-alkyl or -alkenyl and n is a number from 2 to 100.

Comb polymers are polymers in which hydrocarbon radicals having at least 8, in particular at least 10, carbon atoms are bonded to a polymer backbone. Preference is given to homopolymers whose alkyl side chains contain at least 8 and in particular at least 10 carbon atoms. In the case of copolymers, at least 20%, preferably at least 30%, of the monomers have side chains (cf. Comb-like Polymers—Structure and Properties; N. A. Platé and V. P. Shibaev, J. Polym. Sci. Macromolecular Revs. 1974, 8, 117 ff). Examples of suitable comb polymers are fumarate/vinyl acetate copolymers (cf. EP-A-0 153 176), copolymers of a $C_6$–$C_{24}$-olefin and an N—$C_6$— to $C_{22}$-alkylmaleimide (cf. EP-A-0 320 766), and also esterified olefin/maleic anhydride copolymers, polymers and copolymers of $\alpha$-olefins and esterified copolymers of styrene and maleic anhydride.

For example, comb polymers can be described by the formula

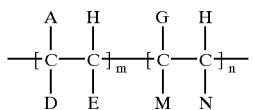

In this formula,
A is R', COOR', OCOR', R"—COOR', OR';
D is H, CH$_3$, A or R";
E is H, A;
G is H, R", R"—COOR', an aryl radical or a heterocyclic radical;
M is H, COOR", OCOR", OR", COOH;
N is H, R", COOR", OCOR, an aryl radical;
R' is a hydrocarbon chain having from 8 to 50 carbon atoms;
R" is a hydrocarbon chain having from 1 to 10 carbon atoms;
m is an integer between 0.4 and 1.0; and
n is a number between 0 and 0.6.

The mixing ratio (in parts by weight) of the ethylene copolymers with paraffin dispersants, alkylphenol resins or comb polymers is in each case 1:10 to 20:1, preferably from 1:1 to 10:1.

Olefin polymers suitable for use as cold flow improvers in the process according to the invention can be derived directly from monoethylenically unsaturated monomers or be derived indirectly by hydrogenation of polymers which are prepared from polyunsaturated monomers such as isoprene or butadiene. In addition to ethylene, preferred copolymers contain structural units which are derived from α-olefins having from 3 to 24 carbon atoms and molecular weights of up to 120 000. Preferred α-olefins are propylene, butene, isobutene, n-hexene, isohexene, n-octene, isooctene, n-decene, isodecene. The comonomer content of olefins is preferably between 15 and 50 mol %, more preferably between 20 and 35 mol % and especially between 30 and 45 mol %. These copolymers can also contain small amounts, for example up to 10 mol %, of further comonomers, for example nonterminal olefins or nonconjugated olefins. Preference is given to ethylene-propylene copolymers.

The olefin copolymers can be prepared by existing methods, for example by means of Ziegler or metallocene catalysts.

Further suitable flow improvers are polyoxyalkylene compounds; for example esters, ethers and ether/esters which bear at least one alkyl radical having from 12 to 30 carbon atoms. When the alkyl groups are derived from an acid, the radical is derived from a polyhydric alcohol; when the alkyl radicals come from a fatty alcohol, the radical of the compound is derived from a polyacid.

Suitable polyols are polyethylene glycols, polypropylene glycols, polybutylene glycols and their mixed polymers having a molecular weight of from approx. 100 to approx. 5000, preferably from 200 to 2000. Also suitable are alkoxylates of polyols, for example glycerol, trimethylolpropane, pentaerythritol, neopentyl glycol, and also the oligomers obtainable therefrom by condensation and having from 2 to 10 monomer units, for example polyglycerol. Preferred alkoxylates are those having from 1 to 100 mol, in particular from 5 to 50 mol, of ethylene oxide, propylene oxide and/or butylene oxide per mole of polyol. Particular preference is given to esters.

Fatty acids having from 12 to 26 carbon atoms are preferably used for reaction with the glycols to form the ester additives, although preference is given to using C$_{18}$- to C$_{24}$-fatty acids, especially stearic acid and behenic acid. The esters can also be prepared by esterification of polyoxyalkylated alcohols. Preference is given to fully esterified polyoxyalkylated poylols having molecular weights of from 150 to 2000, preferably from 200 to 600. PEG-600 dibehenate and glycerol-20-ethylene glycol tribehenate are particularly suitable.

The additive concentrates can be used in the mixing process prediluted with solvent or preferably solvent-free, and more highly viscous, waxy substances are preferably used in heated form. The prerequisite is merely that the raw materials are flowable and pumpable.

The process according to the invention relates, for example, to the mixing of two cold flow improvers, of one cold flow improver with a solvent, or of two cold flow improvers with a solvent. The process according to the invention likewise relates, for example, to the mixing of one, two or more cold flow improvers with two or more solvents. It is also possible to mix together one or more, for example two, three, four, or else more cold flow improvers and one or more solvents. The proportion of the individual cold flow improvers in the mixture (in parts by weight; without solvent) is between 1 and 90% by weight, preferably between 2.5 and 80% by weight and especially between 5 and 70% by weight. The solvent proportion is between 10 and 95% by weight, preferably between 20 and 80% by weight, especially between 25 and 75% by weight. In the case of dilutions, for example of ethylene copolymers, it is also possible for one active ingredient alone to be present.

Suitable solvents or dispersants are aliphatic and/or aromatic hydrocarbons or hydrocarbon mixtures, for example petroleum fractions, kerosene, decane, pentadecane, toluene, xylene, ethylbenzene or commercial solvent mixtures such as Solvent Naphtha, ®Shellsoll AB, ®Solvesso 150, ®Solvesso 200, ®Exxsol, ®ISOPAR and ®Shellsol D types. The solvent mixtures specified contain different amounts of aliphatic and/or aromatic hydrocarbons. The aliphatics may be straight-chain (n-paraffins) or branched (isoparaffins). Aromatic hydrocarbons may be mono-, di- or polycyclic and optionally bear one or more substituents. Polar solubilizers, for example butanol, 2-ethylhexanol, decanol, isodecanol or isotridecanol or higher ethers and/or esters can also optionally be added. In addition to solvents based on mineral oils, solvents based on renewable raw materials are also suitable, for example biodiesel based on vegetable oils and the methyl esters derived therefrom, in particular rapeseed oil methylester, and also synthetic hydrocarbons which are obtainable, for example, from the Fischer-Tropsch process.

The additive mixtures prepared by the process according to the invention are suitable for improving the cold flow properties of animal, vegetable or mineral oils. They are particularly suitable for use in middle distillates. Middle distillates are in particular those mineral oils which are obtainable by distillation of crude oil and boil in the range from 120 to 450° C., for example kerosene, jet fuel, diesel and heating oil. Preference is given to using those middle distillates which contain less than 350 ppm of sulfur, more preferably less than 200 ppm of sulfur, in particular less than 50 ppm of sulfur and in special cases less than 10 ppm of sulfur. These are generally those middle distillates which have been subjected to refining under hydrogenating conditions, and therefore contain only small proportions of polyaromatic and polar compounds. They are preferably those middle distillates which have 95% distillation points below 370° C., in particular 350° C. and in special cases below 330° C.

The additive mixtures according to the invention can also be used in biodiesel. "Biodiesel" or "biofuel" are fatty acid alkyl esters of fatty acids having from 14 to 24 carbon atoms and alcohols having from 1 to 4 carbon atoms. Usually, a relatively large portion of the fatty acids contains one, two or three double bonds. These are more preferably, for example, rapeseed oil methylester and its mixtures with further vegetable oil esters. The additives according to the invention can be used with the same success in mixtures of fatty acid methyl esters and mineral oil diesel. Such mixtures preferably contain up to 25% by weight, in particular up to 10% by weight, especially up to 5% by weight, of fuel oil of animal or vegetable origin.

Mineral oils or mineral oil distillates improved in their cold properties by the additive mixtures contain from 0.001 to 2% by volume, preferably from 0.005 to 0.5% by volume, of the mixtures, based on the distillates.

The process according to the invention increases the flexibility in the production of a multiplicity of highly differing additive mixtures from the small number of starting materials on which they are based. These additive mixtures can be produced at low capital cost with simultaneously low operating and maintenance costs. In addition, the setting of a defined and reproducible mixing temperature achieves a distinctly improved storage stability even at low temperatures. The extremely rapid mixing procedure makes possible reproducible setting of the colloidal and rheological properties, for example the pour point.

The additive mixtures can be used alone or else together with other additives, for example with pour point depressants, dehazers, antistats, antioxidants, conductivity improvers, lubricity additives, cetane number improvers and additives for reducing the cloud point. In addition, they are used successfully together with additive packages which contain, inter alia, known ashless dispersants, detergents, antifoams, demulsifiers, and corrosion inhibitors. These further additives can of course also be added to the additive mixtures according to the invention in the course of the process according to the invention.

EXAMPLES

TABLE 1

Raw materials used

E1  Copolymer of ethylene and 28% by weight of vinyl acetate having a melt viscosity at 140° C. of 250 mPa s
E2  Terpolymer of ethylene, 30% by weight of vinyl acetate and 8% by weight of vinyl neodecanoate having a melt viscosity at 140° C. of 95 mPa s
E3  Terpolymer of ethylene, 26% by weight of vinyl acetate and 7% by weight of 4-methylpentene having a melt viscosity at 140° C. of 200 mPa s
E4  Tetradecanol-esterified copolymer of maleic anhydride and tetradecene, 65% in Solvent Naphtha
E5  Reaction product of a terpolymers of $C_{14}/C_{16}$-α-olefin, maleic anhydride and allyl polyglycol with 2 equivalents of ditallow fatty amine, 62% in Solvent Naphtha
E6  Behenic acid-esterified glycerol-20 ethoxylate, 70% in Solvent Naphtha
E7  Copolymer of ethylene and 34.5% by weight of vinyl acetate having a melt viscosity at 140° C. of 105 mPa s
E8  Copolymer of ethylene and 21% by weight of vinyl acetate having a melt viscosity at 140° C. of 530 mPa s Experiment 1

10 000 kg of the polymer E1 (heated to 65° C.) and 10 500 kg of kerosene (T=55° C.) are metered in parallel into a conveying tube over the course of two hours and conveyed via a static mixer equipped with helical elements and having a diameter of 100 mm and a length of 2000 mm. The pressure drop over the static mixer is 0.2 bar, the mixing time 2.5 seconds. The resulting mixing temperature is 60° C. This results in a homogeneous 49% polymer suspension which is fully homogeneous even after storage at 40° C. for 7 days.

Experiment 2

The procedure of experiment 1 was repeated, except that the polymer E1 was fed to the mixing zone at 75° C. and the solvent at 85° C., which results in a mixing temperature of 8° C. The initially almost clear solution becomes cloudy on cooling and is still fully homogeneous after storage at 40° C. for 7 days.

Experiment 3 (Comparative)

The procedure of experiment 1 was repeated, except that the polymer E1 was fed to the mixing zone at 90° C. and the solvent at 115° C., which results in a mixing temperature of 98° C. The initially almost clear solution becomes cloudy on cooling and, after storage at 40° C. for two days, exhibits a clear supernatant of approx. 6% by volume; after 7 days of storage, the formulation exhibits 39% by volume of polymer sediment and a clear supernatant.

Experiment 4 (Comparative)

10 000 kg of the polymer E1 and 10 500 kg of kerosene are charged to a vessel and heated to 60° C. by means of jacket heating (vapor temperature 120° C.). After 3 hours of circulation, the mixture still exhibits distinct inhomogeneities; only after 8 hours is it homogeneous. After storage at 40° C. for 2 days, this suspension consists of 60% by volume of a milky, white bottom phase and an opaque supernatant. After storage at this temperature for 7 days, 25% by volume of polymer have sedimented, and the supernatant is clear.

Experiment 5

5000 kg of the 49% polymer suspension from experiment 1 at a temperature of 60° C. and 7250 kg of kerosene at a temperature of 25° C. are simultaneously conveyed through the static mixer from experiment 1 within one hour. The mixing temperature of the formulation is 38° C. The resulting 20% polymer suspension is homogeneous and shows no sedimentation even after storage at 25° C. for two weeks.

Experiment 6 (Comparative)

5000 kg of the 49% polymer suspension from experiment 1 are charged to a vessel, heated to 60° C. by means of jacket heating (vapor temperature 120° C.) with circulation in the course of 6 hours and subsequently diluted with 7250 kg of kerosene. After 4 hours of circulation, a homogeneous suspension is obtained. After storage at 25° C. for 2 days, this suspension exhibits approx. 8% by volume of a bottom phase which is enriched with polymer and, after a week, begins to become clear in the upper region and, after two weeks, consists of 12% by volume of polymer sediment and a clear supernatant.

Experiment 7

7680 kg of polymer E2 and 1920 kg of polymer E3 at temperatures of 70° C. and 72° C. are conveyed continuously through the static mixer described in experiment 1 together with 6400 kg of kerosene (T=55° C.) over the course of 80 minutes. The mixing temperature is 64° C. The resulting 60% suspension is fully homogeneous even after storage at 35° C. for two weeks.

Experiment 8 (Comparative)

The components of experiment 7 are mixed at 60° C. by the process of comparative experiment 4. After storage at 35° C. for two weeks, this suspension exhibits 20% of polymer sediment, and above that approx. 40% by volume each of an opaque and of a clear phase.

Experiment 9

5000 kg of polymer E3 and 1540 kg of polymer E4 at temperatures of 75° C. and 55° C. are continuously conveyed through the static mixer described in experiment 1 together with 5460 kg of kerosene (T=65° C.) over the course of 90 minutes. The mixing temperature is 67° C. The resulting 50% suspension is homogeneous even after storage at 40° C. for two weeks.

Experiment 10

5500 kg of polymer E2 (T=94° C.), 3550 kg of polymer E5 (T=45° C.) and 1570 kg of polymer E6 (T=72° C.) are conveyed continuously through the static mixer described in experiment 1 together with 5380 kg of kerosene (T=53° C.) over the course of 90 minutes. The mixing temperature is 66° C. The resulting 55% suspension is homogeneous even after storage at 40° C. for three weeks.

Experiments 11 to 15: Setting of the Pour Point

In the mixing apparatus of experiment 1, 9000 kg of a mixture of 7200 kg of polymer E7 and 1800 kg of polymer E8 were mixed with 9000 kg of kerosene at different temperatures. Table 2 reports the temperatures of the polymers, solvent and resulting formulation, the visual appearance of the polymer and also the pour points of the formulations measured. The pour point is determined to ISO 3015.

TABLE 2

Experiments for influencing the pour point

| Experiment | $T_{Polymer}$ | $T_{Solvent}$ | $T_{Mixture}$ | Pour point |
|---|---|---|---|---|
| 11 | 95° C. (clear) | 75° C. | 84° C. | −3° C. |
| 12 | 92° C. (clear) | 32° C. | 61° C. | −3° C. |
| 13 | 81° C. (opalescent) | 77° C. | 81° C. | 0° C. |
| 14 | 69° C. (opalescent) | 94° C. | 82° C. | 3° C. |
| 15 | 53° C. (cloudy) | 92° C. | 72° C. | 18° C. |

What is claimed is:

1. A continuous process for preparing an additive mixture for improving cold flow properties of mineral oils and mineral oil distillates, said additive mixture comprising
   A) a cold flow improver for middle distillates, and at least one further component comprising
   B) a further cold flow improver, and/or
   C) an organic solvent, said process comprising mixing the cold flow improver having a viscosity below 5000 mPas and the at least one further component in a static mixer to provide the additive mixture at an outlet temperature of the static mixer being from 0° C. to 90° C.

2. The process of claim 1, wherein the outlet temperature is from 30 to 90° C.

3. The process of claim 1, wherein the cold flow improver comprises at least one copolymer of ethylene and further ethylenically unsaturated comonomers.

4. The process of claim 1, wherein the cold flow improver comprises at least one oil-soluble polar nitrogen compound.

5. The process of claim 1, wherein the cold flow improver comprises at least one comb polymer.

6. The process of claim 1, wherein the cold flow improver comprises at least one alkylphenol-aldehyde resin.

7. The process of claim 1, wherein the cold flow improver comprises at least one polyoxyalkylene derivative.

8. The process of claim 1, wherein the cold flow improver comprises at least one olefin copolymer.

9. The process of claim 1, wherein the static mixer comprises a helical mixer having helical element groups having from 2 to 200 mixing elements.

10. The process, wherein the static mixer has a mixing zone having a relative mixer-L/D of from 2 to 50, where L is length and D is the diameter of mixing zone.

11. The process of claim 10, wherein a pressure drop over the mixing zone is less than 10 bar.

12. The process of claim 1, wherein a mixing time is less than 60 s.

13. The process of claim 1, wherein the cold flow improver comprises a terpolymer which, apart from ethylene, contains from 0.1 to 12 mol %, of vinyl neononanoate or of vinyl neodecanoate, and from 3.5 to 20 mol %, of vinyl acetate, and a total comonomer content is between 8 and 21 mol %.

14. The process of claim 1, wherein the cold flow improver comprises a terpolymer which, apart from ethylene and from 8 to 18 mol % of vinyl esters, also contains from 0.5 to 10 mol % of olefins selected from the group consisting of propene, butene, isobutylene, hexene, 4-methylpentene, octene, diisobutylene, norbornene, and mixtures thereof.

15. The process of claim 1, wherein the outlet temperature of the additive mixture at the outlet of the static mixer is from 50 to 85° C.

16. The process of claim 1, wherein the cold flow improver comprises a terpolymer which, apart from ethylene, contains from 0.2 to 5 mol %, of vinyl neononanoate or of vinyl neodecanoate, and from 3.5 to 12 mol %, of vinyl acetate, and a total comonomer content is between 8 and 21 mol %.

17. The process of claim 1, wherein the cold flow improver comprises a terpolymer which, apart from ethylene, contains from 0.2 to 5 mol %, of vinyl neononanoate or of vinyl neodecanoate, and from 8 to 15 mol %, of vinyl acetate, and the total comonomer content is between 12 and 18 mol %.

18. The process of claim 1, wherein the cold flow improver comprises a terpolymer which, apart from ethylene, contains from 0.1 to 12 mol %, of vinyl neononanoate or of vinyl neodecanoate, and from 8 to 15 mol %, of vinyl acetate, and the total comonomer content is between 12 and 18 mol %.

19. A process for the preparation of an additive mixture, said process comprising passing a cold flow improver to a static mixer and therein mixing the cold flow improver with a further cold flow improver selected from the group consisting of a further ethylene copolymer, an oil-soluble polar nitrogen compound, a comb polymer, an alkylphenol aldehyde resin, a polyoxyalkylene derivative, an olefin copolymer, an organic solvent, and mixtures thereof, wherein the cold flow improver is a copolymer of ethylene and at least one olefinically unsaturated compound, said cold flow improver having a viscosity below 5000 mPas, the static mixer having from 2 to 200 mixing elements and said static mixer having an outlet temperature ranging from 30° C. to 90° C. to provide said additive mixture.

20. The process of claim 19, wherein the olefinically unsaturated compound is selected from the group consisting of a vinyl ester, an acrylic ester, a methacrylic ester, an alkyl vinyl ether, an alkene, and mixtures thereof.

21. The process of claim 20, wherein the olefinically unsaturated compound has alkyl groups which are substituted by one or more hydroxyl groups.

22. The process of claim 19 wherein the mixing elements are helical mixing elements.

* * * * *